United States Patent [19]

Drury, Jr. et al.

[11] 3,950,290

[45] Apr. 13, 1976

[54] AQUEOUS COATING AND PRINTING COMPOSITIONS

[75] Inventors: Raymond L. Drury, Jr.; Charles S. Nevin, both of Decatur; James W. Hines, Maroa, all of Ill.

[73] Assignee: A. E. Staley Manufacturing Company, Decatur, Ill.

[22] Filed: May 1, 1973

[21] Appl. No.: 356,243

[52] U.S. Cl. ............... 260/23 EM; 106/29; 106/30; 260/23 ST; 427/258; 427/288; 428/500; 428/511
[51] Int. Cl.² ......................................... C08L 93/00
[58] Field of Search...... 260/23 ST, 23 EM; 106/29, 106/30; 427/258, 288; 428/500, 511

[56] References Cited
UNITED STATES PATENTS

| | | | |
|---|---|---|---|
| 2,640,752 | 6/1953 | Bloch | 106/29 |
| 2,762,712 | 9/1956 | Bloch | 106/29 |
| 2,824,846 | 2/1958 | Salyer | 260/23 ST |
| 2,926,151 | 2/1960 | Kingston | 260/23 ST |
| 2,941,968 | 6/1960 | McKenna | 260/23 ST |
| 3,660,329 | 5/1972 | Wysocki | 106/30 |
| 3,668,329 | 5/1972 | Wysocki | 106/30 |

Primary Examiner—M. J. Welsh
Assistant Examiner—William E. Parker
Attorney, Agent, or Firm—M. Paul Hendrickson; Charles J. Meyerson

[57] ABSTRACT

This invention provides a high-solids, low-viscosity, aqueous vehicle particularly adapted for use in coating cellulosic substrates under ambient conditions. The vehicle comprises a water-soluble oil with minute styrene polymer particles uniformly dispersed therein. The water-soluble oil portion comprises the reaction product of a dibasic acid or a dibasic anhydride and a drying oil which is then reacted to provide the water-soluble salt thereof with a nitrogen base. The aqueous vehicle is especially useful in high solids inks and overprint varnishes.

67 Claims, No Drawings

AQUEOUS COATING AND PRINTING COMPOSITIONS

BACKGROUND OF THE INVENTION

There is a need for low cost, aqueous-type vehicles which are suitable for use as continuous film forming printing inks. Organic solvent vehicles create health, safety, pollution and other hazards. These hazards would be circumvented with the advent of a commercially acceptable, aqueous vehicle. Heretofore, numerous aqueous vehicles have been proposed as an organic vehicle replacement. Unfortunately, the aqueous based vehicles fail to possess prerequisite properties which enable them to function as an acceptable, organic vehicle replacement.

Included among the adverse functional attributes of aqueous based printing vehicles are: poor gloss, inferior film hardness, inflexibility and brittleness, incompatibility with diverse ink formulation components, poor wet and dry-scuff resistance, non-homogenity or inability to retain ink homogenity throughout the printing operation, unstable viscosity, poor pigment loading, crazing, false bodying, floating and flocculation problems, low pigment to binder ratios, compounding deficiencies, poor printability characteristics, (e.g., accumulation or buildup of ink deposits upon the printing member, undesirable rheological characteristic, poor tack characteristics, inferior ink transfer from the printing member to substrate, inferior hue and hiding power, inferior color development, excessive drying requirements, etc.). Since ink formulations are dependent upon a composite of functional attributes, attempts to correct one or more of the aforementioned defects generally accentuates some other undesirable characteristics to an even greater degree. These factors have frustrated attempts in finding a commercially acceptable aqueous vehicle substitute.

OBJECTS OF THE INVENTION

It is an object of the present invention to provide a superior, aqueous, printing ink composition.

Another object of the invention is to provide a high total solids, aqueous, printing ink composition possessing a functional printing ink viscosity.

A further object of the invention is to provide a water-soluble, aqueous vehicle which exhibits exceptional functional attributes in printing ink formulations.

A still further object of the invention is to provide a method of printing cellulosic substrates with aqueous ink formulations at a high total solids level.

An additional object is to provide an aqueous based ink vehicle characterized as possessing improved compatibility with organic, inorganic coloring agents and ink additives, compounding characteristics, ease of application and printing characteristics.

Another object of the invention is to provide a superior base ink at a high pigmentation and containing a novel, water-soluble, aqueous vehicle.

A further object of this invention is to provide an improved aqueous vehicle useful as an overprint varnish.

A still further object is to provide an aqueous vehicle containing a slip agent adapted for use in formulating superior printing inks and overprint varnishes.

An additional object is to provide an aqueous vehicle containing an anti-skid agent suitable for use in formulating superior printing inks and overprint varnishes.

DISCLOSURE OF THE INVENTION

This invention relates to water based ink formulations suitable for use in the printing of cellulosic substrates, an aqueous vehicle and a method for using the same. More particularly, the present invention relates to a dispersion comprised of polymerized styrene particles uniformly dispersed throughout a continuous aqueous external phase of a water-soluble, nitrogen base neutralized, dicarboxylated drying oil, the printing inks containing the dispersion and the method for printing cellulosic substrates therewith.

According to the present invention, there is provided a printing ink composition suitable for use under ambient printing conditions and containing uniformly dispersed throughout the ink composition a styrene polymer dispersion as a principle ink vehicle on a weight basis, said printing ink composition comprising an admixture of:

A. A styrene polymer dispersion comprising:

a. a continuous, aqueous external phase consisting essentially of an adduct reaction product of an unsaturated glyceride oil, and at least one dicarboxylic acid selected from the group consisting of an alpha, beta-ethylenically unsaturated dicarboxylic acid and an alpha, beta-ethylenically unsaturated dicarboxylic acid anhydride, said adduct reaction product being reacted with an aqueous solution of a nitrogen base containing at least one hydrogen atom contiguously attached to a nitrogen atom in an amount sufficient to provide a water-soluble, salt reaction product having a pH within the range of 7.0 to 10.0, b. a non-continuous, internal phase of minute styrene polymer particles having an average particle size of less than 0.4 micron uniformly dispersed within said external phase, said styrene polymer dispersion being further characterized as containing (on total dry weight basis) at least 40% by weight of said external phase and said internal phase, and at least one part to less than four parts external phase dry solids for each six parts by weight of dry internal phase solids, and B. a color imparting agent of at least one member selected from the group consisting of an organic coloring agents and an inorganic coloring agent with the proviso that when the major coloring agent (on a total dry solids coloring agent weight basis) is an organic coloring agent, the ink composition contains from at least one part by weight to less than four parts by weight organic coloring agent for each four parts by weight styrene polymer dispersion dry solids, and that when the major coloring agent (total dry solids coloring agent weight basis) is an inorganic coloring agent, the ink composition contains from about 1 to about 8 parts by weight inorganic coloring agent for each two parts by weight of dry styrene polymer dispersion solids, said ink composition being further characterized as containing at least 30% by weight dry solids and a sufficient amount of (A), (B), ink additives and water to provide a No. 2 Zahn cup reading of between about 15 to about 50 seconds, with the further proviso that when the ink composition contains organic coloring agents as a major coloring agent (on a weight basis), the total dry solids content of said printing ink composition ranges from about 30% to about 55% and when the inorganic coloring agents are a major coloring agent, the total dry solids content of said ink composition ranges from at least 45% to about 80% by weight.

The aqueous vehicle (i.e., the styrene polymer dispersion) can be prepared by (a) initially reacting glyceride oil with a dicarboxylic acid anhydride or dicarboxylic acid, (b) reacting the resultant glyceride drying oil adduct with a nitrogen base compound having at least one acid reactive hydrogen atom to provide a water soluble salt reaction product and (c) polymerizing styrene in the presence of the water soluble reaction product under emulsion polymerization conditions to provide a styrene polymer dispersion containing the water-soluble, reaction product as a continuous external phase with an internal phase of minute, polymerized styrene polymer particles uniformly dispersed therein.

MALEATION STEP

The initial step of reacting glyceride oils with dicarboxyl acids to provide adducts thereof is well known to the art. For example, various adducts of long-chain ethylenically unsaturated fatty materials and alpha, beta-ethylenically unsaturated dicarboxy compounds (the alpha, beta-ethylenically unsaturated dicarboxy compounds are also referred to as "maleyl compounds") are disclosed in U.S. Pat. Nos. 2,033,131; 2,033,132 and 2,063,540 to Ellis; U.S. Pat. Nos. 2,188,882-90 and 2,285,646 to Clocker; 2,342,113 to Blair et al.; 2,423,230; 2,455,743 and 2,462,618 to Eilerman; 2,640,814 to Schmutzler; 2,678,934 to Grummit; 2,941,968 to McKenna; 2,967,837 to Greenfield; 3,015,566 to Becker et al.; 3,030,321 to Lombardi; etc. For the most part, these references have been directed principally to the so-called "maleated" or "maleinized" oils.

The maleating step is carried out by reacting the long-chain ethylenically unsaturated fatty compound and the alpha, beta-ethylenically unsaturated dicarboxy compound at a temperature of about 150°C. to 300°C. The long-chain fatty compound and the dicarboxy compound can be mixed together and heated to the desired reaction temperature. Alternatively, the dicarboxy compound can be added in increments to the long-chain fatty material while the latter is maintained at the desired reaction temperature. The continuous addition method is preferred because in commercial processes it can be controlled and reproduced, particularly when maleic anhydride is employed. When using maleic anhydride in a batch method, the exothermic temperature must be carefully controlled in order to prevent foaming and sublimation of the maleic anhydride. When the continuous addition method is used, the addition rate of maleic anhydride is controlled so that there is little or no refluxing.

This adduct reaction may be carried out at atmospheric pressure in an open vessel or under pressure in an autoclave. Maleic anhydride forms an adduct in almost quantitative yields in an open vessel and accordingly, sealed reactors are not necessary. Other dicarboxy compounds, which are less efficient adduct formers, will give higher yields when a sealed system is employed.

The ratio of alpha, beta-ethylenically unsaturated dicarboxy compound to ethylenically unsaturated long-chain fatty compound in the reaction vessel can range from at least 0.5 moles to 2 or more of dicarboxy compound per equivalent of unsaturation in the unsaturated long-chain fatty compound. For example, the preferred naturally occurring glyceride oils, such as soybean oil or linseed oil, can be reacted with from at least 20% to 45% by weight of maleic anhydride to form adducts containing from about 2.0 to 4.5 moles of anhydride moieties per molecule of glyceride oil.

On a comparative basis, ink formulations prepared from adducts which have been obtained by reacting less than 20% by weight maleic anhydride with a glyceride oil do not possess the composite ink properties as those having a higher degree of maleation. Superior ink properties are imparted to ink formulations when more than about 25% by weight anhydride is reacted with the glyceride oil. Maleation of the glyceride oils with more than about 35% by weight maleic anhydride does not provide any significant improvements over those maleated at the 25–35% level. Maleated oils containing on an average of about 3 maleic anhydride moieties per molecule of glyceride oil are particularly well suited in the practicing of the present invention.

Exemplary long-chain ethylenically unsaturated compounds useful in preparing the maleated adducts herein are disclosed in U.S. Pat. No. 3,471,466. The polyunsaturated glyceride oils containing from 10–24 carbon atoms in the unsaturated chain such as those derived from animal and vegetable sources are particularly adapted to provide the maleated adducts herein. Illustrative unsaturated oils include soybean oil, corn oil, cottonseed oil, hempseed oil, tung oil, oiticica oil, safflower oil, peanut oil, linseed oil, tabocca seed oil, cod oil, herring (or menhaden) oil, dehydrated castor oil, etc. The glyceride oils and the esters of other unsaturated long-chain acids, such as the linoleic acid esters of trimethylol propane and tall oil fatty acid esters of pentaerythritol, are preferred since they contain a relatively large number of ethylenic double bonds available as sites for adduct formation. In general, those compounds having on an average at least two, and preferably three to nine, ethylenically unsaturated groups per molecule are preferred. Two conjugated ethylenic double bonds in a glyceride oil are equivalent to a single unconjugated ethylenic double bond because the two conjugated double bonds and the single unconjugated double bond each serve as sites for adduct formation.

While a wide variety of alpha, beta-ethylenically unsaturated dicarboxy compounds, such as maleic acid, fumaric acid, dimethyl maleate, dibutyl maleate, monomethyl hydrogen maleate, mono-2-ethylhexyl hydrogen maleate, citraconic acid, citraconic anhydride, itaconic acid, itaconic anhydride, ethyl maleic acid, maleimide, maleamic acid, etc., can be used; maleic anhydride is the preferred dicarboxy compound because of (1) its low cost, (2) the ease with which it forms adducts in almost quantitative yields and (3) the high concentration of tertiary amide salt groups which result from the reaction of the anhydride adduct with a basic nitrogen compound. Fumaric acid requires more severe reaction conditions to form an adduct in lower yields. Citric acid and maleic acid, which form alpha, beta-ethylenically unsaturated dicarboxy compounds under the conditions of the maleation reaction, can also be used in this invention. The break-free oils (e.g., alkali refined linseed oil and soybean oil) which are substantially free from natural antioxidants have been found particularly useful herein.

Upon completing the glyceride adduct reaction, the adduct products are then converted to the salt form by reacting the acid or anhydride moieties with a nitrogen base. Suitable nitrogen bases include bases such as ammonia, ammonium hydroxide, the primary amines, secondary amines, quaternary ammonium hydroxides, mixtures thereof and the like.

Exemplary nitrogen bases include ammonia, ammonium hydroxide, methyl amine, ethyl amine, propylamine, dimethylamine, diethylamine, dipropylamine, trimethylbenzyl ammonium hydroxide, triethylbenzyl ammonium hydroxide, 3-methyoxypropyl amine; 2-amino, 2-methyl, 1-propanol; mono-ethanol ethanol amine; diethanol amine; 2,amino, 2-methyl 1,2 propandiol; 2-(methyl amino)-ethanol; 2-amino-2methyl-1,3 propanediol, morpholine, mixtures thereof and the like.

In a more limited aspect of the present invention there is provided the water-soluble amic salts of the glyceride anhydride adduct. These amic salts are prepared by reacting the anhydride moities of the glyceride adduct with a nitrogen base containing at least one reactive hydrogen atom. Illustrative nitrogen bases containing at least one reactive hydrogen atom may be characterized as follows:

The glyderide maleic anhydride adduct reaction with a nitrogen base containing at least one hydrogen contiquously attached to a nitrogen atom may be illustrated as follows:

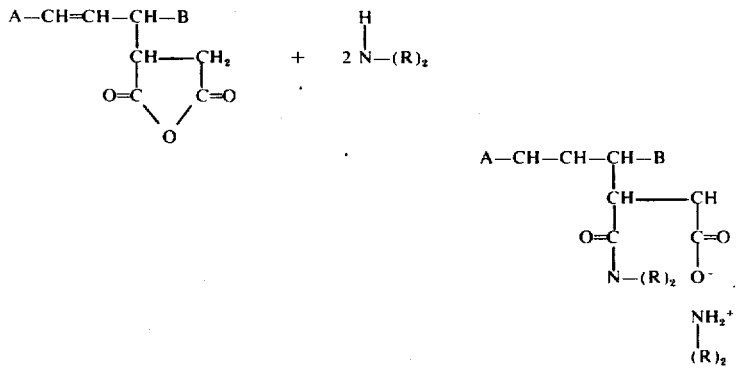

wherein A and B represent the remaining portion of the glyceride maleic anhydride adduct and (R)$_2$ represents R$_1$ and R$_2$ as defined above. The R$_1$ and R$_2$ groups may be substituted provided the substituents do not interfer with the amic salt reaction. As evident from the above equation, ammonium hydroxide, the primary and secondary amines all contain active hydrogen groups which will result in the formation of an amide and the partial salt thereof (i.e., amic acid salt grouping).

A stoichiometric amount or more of nitrogen base should be admixed with the adduct to provide a water-soluble product having a pH ranging from about 7.0 to 10.0. Many nitrogen bases are readily volatized when admixed with the glyceride adducts at elevated temperatures. Accordingly, upon completing the adduct reaction, it is usually desirable to cool before admixing the nitrogen base therewith. Performance of the final styrene dispersion is improved when the adduct is neutralized to a pH of greater than 7.5 to less than about 8.5 with particularly good results being achieved within the pH range of 7.6 to 8.2.

The glyceride adduct may be added to a mixture of water and the nitrogen base. Alternatively, the water and/or nitrogen base may be mixed separately with the adduct. Because the styrene dispersions herein are extremely fluid at a dry solids content of less than 40% by weight, it is undesirable at this processing stage to add excessive water. In the polymerization process, from about 40 to about 60% by weight total dry solids (preferably about 50 to 60%) are employed. With agitation, the nitrogen base reaction step can be effectuated under ambient conditions, however, reaction temperatures of about 135°F. to about 170°F. are preferred. The reaction proceeds very rapidly.

The nitrogen base which is employed in reacting and neutralizing the oil adduct has a pronounced effect upon the drying characteristics of the styrene dispersions herein. Adducts reacted and neutralized with nitrogen bases possessing a relatively low boiling point (e.g., ammonium hydroxide — B.P. — 38°C., methyl amine — B.P. — 7°C., diethylamine — B.P. +4°C., ethylamine — B.P. — +16.6°C.) will dry more quickly than those adducts reacted and neutralized with the higher molecular weight nitrogen bases (e.g., the higher boiling amines). Depending upon the particular nitrogen base utilized, the drying rate under ambient drying conditions can broadly range from about a second up to an hour or more. The drying rates of the less volatile amine adducts can be accelerated by applying heat and other suitable drying means.

Upon completion of the nitrogen base reaction, styrene is polymerized in situ with the water-soluble adduct to provide an external aqueous, water-soluble phase of the water-soluble adduct and an internal phase of minute styrene polymer particles uniformly dispersed therein.

The styrene polymer dispersion is prepared by polymerizing the styrene and other comonomers (if desired) in the presence of a catalyst and the water-soluble, glyceride adduct.

The major dispersing agent or emulsifier used in this invention is the water-soluble adduct. The water-soluble, glyceride adduct functions as a dispersing agent or emulsifier during the emulsion polymerization of the monomers. Accordingly, the emulsion polymerization can easily be conducted in the absence of other dispersing or emulsifying agents (i.e., substantially free from emulsifying agents other than the water-soluble adduct).

In order to achieve a styrene dispersion possessing suitable functional attributes the weight ratio (dry solids basis) of water-soluble adduct to polymerizable monomeric constituents is usually maintained between about 1:3 to about 2:3. When an insufficient amount of adduct is utilized, excessive coagulum, excessive free monomers and inferior functionality results. Excessive water-soluble adduct concentrations will adversely affect performance. Unexpectedly superior results (e.g., ink and coating performance, styrene particle size, exceptionally low unpolymerized monomer content) are achieved when the aqueous vehicle contains a dry solids weight ratio of water-soluble adduct to styrene polymer within the range of about 3:7 to about 7:13.

Although not necessary, the so-called anionic and nonionic surface active agents may be also used. Suitable anionic surface active agents include alkali metal salts of alkyl aryl sulfonates, such as sodium dodecyl benzene sulfonate, sodium diamyl naphthalene sulfonate, disodium 4-dodecyl-oxydi(benzene sulfonate) etc.; alkali metal salts of alkyl sulfates, such as sodium lauryl sulfonate, sodium myristyl sulfate, etc. Suitable nonionic surface active agents include the alkyllauryl polyoxyethylene glycols and alkylpolyoxyethylene glycols containing from 4 to 18 carbon atoms in the alkyl group and from about 2 to 20 oxyethylene units. The most advantageous concentration will depend, as in all emulsion polymerizations, in part on the emulsifier or emulsifiers used, the monomers to be polymerized, the initiator system, etc.

Conventional non-polymerizable anionic surface active agents can be used in a concentration up to about 0.6 parts by weight per 100 parts by weight of the polymerizable monomers, but preferably in an amount of less than 0.1 part by weight of the polymerizable monomers. As the concentration of anionic emulsifier increases, adhesion and wet-rub resistance decreases markedly. The nonionic and anionic emulsifiers will generally be less than about 3% of the total monomer weight. The best results are obtained when the total concentration of non-polymerizable anionic emulsifier and nonionic emulsifier is less than about 1.6% by weight of the total monomer concentration.

As polymerization catalysts, there may be used one or more free radical catalysts. The catalyst can be soluble in aqueous solutions of the emulsifier or soluble only in the monomer phase, or both. Among the useful catalysts include the persulfates, inorganic peroxides, organic peroxides and hydroperoxides. Illustrative catalysts include hydrogen peroxide, benzoyl peroxide, tertiary butyl hydroperoxide, diisopropyl benzene hydroperoxide, cumene hydroperoxide, caproyl peroxide, methyl ethyl ketone peroxide, ammonium and potassium persulfate, mixtures thereof, and the like. In part, the particular combination of monomers governs the selection of the catalysts since some monomers respond better to one variety than they do to another. The chemical reactivity characteristics of the amic salt or salt moities is another factor governing the selection of the most suitable catalyst. The organic hydroperoxides have been found to afford significantly better control over the styrene particle size and a significant reduction in coagulum, particularly when the ammonium amic salt is the water-soluble adduct.

The required amount of free radical catalysts is about proportional to the concentration of monomers used. The usual range is 0.01% to 3% by weight of the total monomer weight. The preferred range is about 0.10 to 1.0% while the range of 0.1–0.4% is usually best. The optimum amount of catalyst is determined in large part by the nature of the particular monomers selected, including impurities which accompany particular monomers. In general, it is preferred to use the lowest concentration of catalyst sufficient to give the desired rate of conversion since the higher the catalyst concentration, the lower the polymer's molecular weight and the poorer its barrier properties.

A promoter for the catalysts is used to hasten the reaction at low temperature and to avoid coagulation. The promoter may be a reducing agent and the combination with the peroxidic catalyst is frequently referred to as a "redox system". Such systems are known and exemplary promoters include erythorbic acid, ascorbic acid, soluble sulfites, hydrosulfites (e.g., sodium hydrosulfite), sulfoxalates (e.g., zinc or sodium formaldeyde sulfoxalate), thiosulfates, bisulfites (e.g., sodium metabisulfites) mixtures thereof and the like.

The amount of promoter required varies, as is known, with the free-radical initiator chosen and with the particular promoter. The emulsifying agent also affects somewhat the amount of catalyst used as does the particular monomers. At the outside, not more than 3% or less than 0.01% of promoter is used in these situations. The preferred range of erythorbic or ascorbic acid is at the lower end of this range up to about 0.1% while sulfites are used preferably in an amount of 0.1% to 1%.

The emulsion polymerization is an exothermic reaction. Failure to appropriately control the reaction temperature during the polymerization can seriously and adversely affect the functional characteristics of the aqueous vehicle in ink and coating formulations. Temperatures in excess of 200°F. tend to result in excessive large particles and excessive development of coagulum. Conversely, the lower temperatures (e.g., less than 95°F.) coupled with an insufficient polymerization time results in incomplete polymerization and the presence of excessive free monomers. Temperatures within the range of about 140°F. to about 190°F. are particularly useful in preparing the styrene polymer dispersions herein.

The polymerization process can be carried out batchwise or continuously. Due to the exothermic nature of the polymerization reaction, it is not pragmatic to work entirely batchwise by emulsifying the entire portion of monomers and proceeding with polymerization. The best mode of proceeding with the polymerization is to start with part of the monomers to be polymerized and add more monomer or monomers as polymerization proceeds. Gradual or incremental addition of monomer (either continuous or periodic) is advantageous in reaching a high solids content with optimum control of reaction conditions. Gradual or incremental addition of ethylenically unsaturated monomers, including the styrene, is particularly advantageous since this promotes the formation of additional miscella facilitating the formation of a polydisperse emulsion polymer. Catalyst or components of the redox system catalyst may be added as the polymerization proceeds and these can be used to control the speed of reaction to avoid over-heating. In those cases where gradual or delayed addition of monomer is employed, it may be desirable to use part or all of the emulsifier (including the adduct) to emulsify the monomers prior to the addition to the polymerization zone.

The preferred method of preparing the styrene polymers of this invention comprises the steps of (1) initiating the polymerization of the monomers in the presence of the water-soluble, glyceride adduct and a catalyst system, (2) adding to the polymerization media additional monomer and additional catalyst at a predetermined rate and (3) terminating the polymerization at a predetermined solids content usually in the range of about 50% to 60% by weight total solids.

In preparing the styrene polymer dispersion or aqueous vehicle, the styrene monomer comprises (on a weight basis) at least a major portion of the monomer feed (i.e., styrene is at least the major polymer component). If desired, the styrene can be copolymerized with other monoethylenically unsaturated monomers in minor amounts.

Suitable other monoethylenically unsaturated comonomers include alkyl esters of alpha, beta-ethylenically unsaturated monocarboxylic acids containing from 1 to 18 carbon atoms in the alkyl group, such as methyl acrylate, ethyl acrylate, butyl acrylate, 2-ethyl hexyl acrylate, ethoxyethyl acrylate, methyl methacrylate, ethyl alpha-cyanoacrylate, etc.; alpha, beta-ethylenically unsaturated nitriles, such as acrylonitrile, methacrylonitrile, ethacrylonitrile, etc.; alpha, beta-ethylenically unsaturated amides, such as methacrylamide, etc.; (e.g., vinyl chloro benzene); alpha methyl styrene, vinyl halides,, such as vinyl chloride, vinyl bromide, etc.; di-esters of alpha, beta-ethylenically unsaturated dicarboxylic acids, such as dimethyl itaconate, diethyl fumarate, dimethyl maleate, etc.; alkayl vinyl ethers, such as methyl vinyl ether, ethyl vinyl ether, etc.; alkyl vinyl ketones, such as methyl vinyl ketone, terminal alpha-olefins (e.g., isobutylenes, butene-1, hexene-1), etc.

Although the water-soluble glyceride adducts impart excellent wetting characteristics, hydroxyalkyl esters of alpha, beta-ethylenically unsaturated acids may be copolymerized with the styrene to impart further internal polymeric wetting characteristics thereto (e.g., usually less than 10% by weight and preferably less than 5% of the total copolymerized monomer weight). Illustrative hydroxyalkyl esters of alpha, beta-ethylenically unsaturated carboxylic acids include hydroxyethyl acrylate, 2-hydroxypropyl acrylate, 4-hydroxybutyl-1-acrylate, hydroxyethyl methacrylate, 2,3-dihydroxypropyl methacrylate, di(hydroxyethyl) itaconate, ethyl hydroxyethyl maleate, di(2,3-dihydroxypropyl) fumarate, hydroxyethyl crotonate, hydroxyethoxyethyl methacrylate, etc. The above compounds are representative of hydroxyalkyl esters containing from 2 to 4 carbon atoms in the alkyl group.

Internal emulsifying characteristics may be imparted to the particles by copolymerizing the styrene with ethylenically unsaturated sulfur acids having a sulfur valence of six. Exemplary copolymerizable ethylenically unsaturated sulfur acids having sulfur in valence state 6 include any of the sulfoalkyl ester of alpha, beta-ethylenically unsaturated acids described in U.S. Pat. Nos. 3,147,301, 3,033,833, 2,914,499, 2,923,734 and 3,024,221, such as sulfoethyl acrylate, sodium sulfoethyl methacrylate, 3-sulfo-2-hydroxy-propylmethacrylate, di(sulfoethyl) itaconate, ethyl sulfoethyl maleate, di(sulfoethyl) fumarate, etc.; bisulfate esters of hydroxyalkyl esters of alpha, beta-ethylenically unsaturated acids, such as bisulfate ester of ethylene glycol monomethacrylate, bisulfate ester of triethylene glycol monoacrylate, etc. Generally, these ethylenically unsaturated sulfur acid, internal emulsifiers will comprise less than 3% of the total copolymer weight (e.g., 0.3%–3.0% and preferably less than 1.5% by weight).

Most suitably, the aforementioned comonomers will comprise less than 25% of the styrene total polymer weight with best results being achieved when those copolymerized monomers are less than 10% by weight (preferably less than 5% by weight of the total copolymerized monomers).

Styrene as the sole polymerized monomeric constituent of the polymer affords an excellent aqueous vehicle for the ink components. Substitution of the styrene with up to 50% by weight of a monovinyl aromatic (such as vinyl toluene) will not adversely effect the functional attributes of the aqueous vehicle. Styrene polymers comprised of styrene and vinyl toluene and substantially free from other copolymerized monomers may effectively be used in practicing the invention herein.

The particle size of the styrene polymer is a significant factor in obtaining a styrene polymer dispersion which can be effectively used in ink formulations. Polymeric dispersions containing excessively large styrene particles (e.g., greater than about 0.5 average micron size) do not possess the prerequisite and composite properties to function properly in ink and coating formulations. Styrene polymer dispersions having an average particle size of less than 0.35 micron (e.g., 0.05–0.35 micron), and preferably less than 0.25 micron are particularly functional in ink and coating formulations. Exceptional results are achieved when the average particle size of the styrene polymer particles prepared herein is within the range of about 0.1 to less than 0.2 micron.

The printing ink characteristics and its printability will be adversely affected by excessive amounts of free monomeric styrene in the styrene polymer. For example, free styrene monomers in excess of 0.7% of the total styrene dispersion weight will result in incompatibility with the diverse ink ingredients, provide potentially available polymerizable styrene monomers (e.g., potential polymeric deposit development upon the printing members), and increase health and safety hazards, etc. Since many of the nitrogen bases are readily volatated under conventional monomeric stripping techniques, the free styrene monomers cannot be effectively removed therefrom by stripping. This problem can be most suitably alleviated by conducting the polymerization under conditions wherein substantially all the available styrene monomers are converted to polymer. Styrene polymer dispersion having less than 0.5% by weight free monomer on a dry dispersion solids basis (e.g., about 0.1% to about 0.4% by weight free styrene and preferably less than 0.30% by weight styrene) are most suitably adapted for use in the printing ink formulations.

On a total aqueous vehicle weight basis, the dry solids content should be at least 40% by weight (i.e., water-soluble adduct and styrene polymer total weight). At a lesser dry solids content, the viscosity characteristics of the aqueous vehicle are too low for satisfactory functionality in ink formulations. Particularly useful aqueous vehicle results are achieved when the total dry solids content of the external phase and internal phase ranges from at least 45% to about 75% by weight and preferably between at least 50% to less than 60% by weight.

Typically, these aqueous vehicles possess a relatively high viscosity at a dry solids level of about 55% by weight dry solids or more. At the higher aqueous vehicle dry solids levels (e.g., 55%–60% level), the viscosity (pH 7.6–8.2, Brookfield at 20 rpm, No. 3 spindle and 77°F.) will normally range between at least 2,000 cps, up to 50,000 cps. Upon dilution with water to lower the dry solids level (e.g., within the 45%–55% range), the aqueous vehicles herein generally exhibit a precipitious viscosity decrease. Aqueous vehicles having a Brookfield viscosity ranging from about 4,000 cps. to less than 7,000 cps. and a total dry solids content of 55 ± 2% weight are particularly well suited in formulating inks. Typically at the 50% weight dry solids level, the viscosity will be less than about 400 cps. (usually less than 300), and about 100 cps. or less (usually less than 75 cps.) at the 45% by weight dry solids level and less than 50 cps. (usually within the range of more than 10 to less than 35) at the 40% dry solids level. These viscosity characteristics are a particularly desirable functional attribute in ink compositions.

Illustrative viscosity characteristics of aqueous vehicles suitable for use in ink formulations include the following:

| LOT NO. 1 at pH 7.8 | | LOT NO. 2 at pH 7.8 | |
|---|---|---|---|
| % dry solids | Viscosity* (cps) | % solids | Viscosity* (cps) |
| 54.8 | 3,490 | 52.8 | 650 |
| 52.5 | 890 | 52.5 | 168 |
| 50.0 | 284 | 50.0 | 72 |
| 47.5 | 122 | 47.5 | 37 |
| 45.0 | 62 | 45.0 | 28.5 |
| 40.0 | 28 | 40.0 | 17 |

*Brookfield, 77°F. at 20 rpm with appropriate spindle

The aforementioned aqueous vehicles possess unexpectedly superior properties in ink base stocks and in press-ready ink preparations. Unlike conventional aqueous ink vehicles, press-ready ink formulation containing the aqueous vehicles herein provide exceptional gloss, homogeneity, resistance to phase separation, ease of compounding and printing, viscosity stability wet and dry-rub resistance, hue and hiding power, excellent machinability and ink transfer during the printing operation, tack, flowability, coverage characteristics, etc. Atypical of conventional aqueous vehicles, these aqueous vehicles provide a greater tolerance in both ink solids loading and water content. The low viscosity characteristics coupled with high solids loading capabilities of the aqueous vehicles enables the printer to provide printed articles of more intense coloring, sharper contrast and greater detail. At high solids levels, superior ink wetting and ink flow characteristics are achievable. Notwithstanding a high solids ink formula level, the aqueous vehicle enables the printer to obtain a significantly greater number of superior printed articles for a given ink quantity because the excellent hold-out of pigment land vehicle on the surface of paper or paperboard.

As mentioned above, both the water-soluble amic adduct salts as well as the complete salts (i.e., the anhydride or dicarboxylic acid adduct moieties have been converted to the complete salt form) may be utilized in the over-print varnishes and ink composition of the present invention. besides the complete salts disclosed herein, nitrogen base adduct salts such as disclosed in U.S. Pat. No. 2,941,968 by M. F. McKenna may be used as an aqueous vehicle for the ink composition and overprint varnish of the present invention. On a comparative, basis, inks formulated with the water dispersible interpolymer of the McKenna patent are substantially inferior to the water-soluble amic adduct salts of the present invention. The amic acid salt moieties of the adduct are principally responsible for these unexpectedly superior ink properties. The degree of maleation, the ratio of internal and external phase solids, the character of the styrene particles, substantial absence of free styrene, the suspending and dispersing and excellent emulsifying characteristics of external phase, etc. are factors which further contribute to its superior functionality. The composite properties and chemical composition of the styrene dispersions herein also possesses superior functional attributes over those obtained by admixing a conventional polymeric latex with the water-soluble adduct.

The color portion or color imparting compositions compatible with the aqueous vehicles of this invention include those coloring agents commonly used in the inks. Color imparting compositions employed with the aqueous vehicles herein include conventional dyes, toners and/or pigments as well as mixtures thereof. Typical pigments contemplated in the present ink compositions include colored as well as white pigments and mineral products conventionally used as printing ink fillers and printing ink extenders. Water insoluble, organic and inorganic printing ink pigments include titanium dioxide, zinc oxide, phthalocyanine blue and green, lead chromate, molybdate orange, zinc sulfide, calcium sulfate, barium sulfate (barytes), clay, mica, calcium carbonate (whiting), silica, benzylidene yellow, cadmium yellow, toluidine toners, sienna, amber, ultramarine blues, chromium oxides, carbon black, antimony oxide, magnesium silicate (talc), aluminum silicate, lead silicate, graphite, aluminum oxide, calcium silicate, diatomaceous silica, limonite, hematite, magnetite, siderite, selenium sulfides, calcined nickel titanate dioxide, molybdate oranges, chrome green, iron blues, benzidine yellows and oranges, iron salts of nitroso compounds, Hansa yellows, Di-nitroaniline oranges, calcium lithol red, barium lithol red, permanent red 2B (watchung), red lake C, lithol rubine red, rhodamine red (process magneta), chrome yellows, victoria blue, methyl violet, and the like, as well as various combinations and preparations depending on the end use for which the ink is designed. Further illustrative dyes and pigments suitable for use as color imparting agents in aqueous formulations containing the polymers may be found in publications such as "Printing and Litho Inks", sixth and completely revised edition 1967 Herbert Jay Wolfe, published by MacNair-Dorland Co., New York City, Chapters V–IX and in Chapter 2 of a book entitled "Industrial Printing Inks" by Louis M. Larsen 1962, Reinhold Publishing Company.

The aqueous vehicles are particularly adapted for use in compounding base stock ink formulations. These base stocks are normally combined with other base stock inks, and as required, other ink additives and let-down vehicles to provide press-ready ink formulation. Because the divergent pigments used in the press-ready ink formulation usually possess inherently different grinding characteristics and optimum particle size for appropriate ink pigmentation, these base stocks conventionally necessitate different grinding techniques for their preparation. Thus, depending upon the particular type of pigment employed, it is conventional to grind the pigment and the aqueous vehicle together (e.g., in vertical and horizontal ball mills, sand mills, "Morehouse" mills, "Kady" mills and high speed dispersing mills). Unlike conventional aqueous vehicles which require a relatively low pigment loading and a low pigment to binder ratio, the aqueous vehicles herein afford a significant increase in base stock pigmentation as well as pigment to binder ratio. Grinding of the pigments to the appropriate size in the presence of the aqueous vehicle enhances the grinding rate and pigment uniformity. Base ink stocks using the aqueous vehicles herein which predominantly contain organic pigments are conveniently prepared at about 20% to about 30% by weight pigment dry solids (based on the total base stock dry solids weight) and at a pigment to binder ratio of about 9:5 to about 1:1. Inorganic pigmented (on a predominate pigment weight basis) base stocks generally have (based on the total base stock dry solids weight) at least 50% to less than about λ% by weight inorganic pigment dry solids (preferably about 60% to about 70% by weight) and a pigment to binder ratio (dry solids basis) ranging from about 5:1 to 1:1 (preferably between about 5:1 to about 3:1). In these base ink stocks, the aqueous vehicle herein can be used as the sole vehicle. Other conventional ink binders may be used (if desired and compatible) in preparing these base stocks. However, the aqueous vehicle herein (on dry solids weight basis) will normally comprise the major ink binder. Significantly improved results are achieved when more than 75% by weight of the base stock binder (preferably more than 90%) is provided by the aqueous vehicle of the present invention.

Under the vigorous mixing conditions such as normally encountered in the preparation of base stocks, the aqueous vehicle has a tendency to foam. This problem can be effectively alleviated by adding a defoaming agent to the aqueous vehicle and pigment in an amount sufficient to inhibit foaming of the base stock. As recognized by the art, the required amount of defoaming agent will depend largely upon the efficacy of the defoaming agent and the degree of turbidity encountered. Incorporation of the defoamers into the base stock will also inhibit foam development in the press-ready ink. Illustrative defoaming agents include alcohols, aliphatic acids and esters, fatty acid soaps, halogenated compounds, nitrogen containing compounds, phosphates, silicones, sulfides, sodium sulfonated oleic acid, sulfated tall oil fatty acid, high-molecular-weight fatty alcohols, oxyethylene polyoxypropylene propylene glycol, alkyl aryl ether alcohol, amine polyglycerol condensates, etc.

Due to its lipophilic and hydrophilic properties, the aqueous vehicles herein are compatible with a broad spectrum of cobinders such as those contionally used in formulating ink and color imparting compositions. The auxiliary cobinders which may be used herein are characterized as either being soluble in the vehicle of this invention or can be uniformly dispersed therein under the basic conditions disclosed herein (e.g., latexes compatible with nitrogen bases at the desired pH range herein). Accordingly, natural and synthetic resins may be formulated with the present aqueous vehicle. Natural resins such as fossil copal, copal, damar, shellac, rosin, mixtures thereof and the like may be employed. Similarly, chemical derivatives and synthetic resins such as rosin derivatives, cumarone resins and derivatives thereof, alkyd and polyester resins, certain cellulose derivatives, etc. may also be used as a cobinder.

Additional, auxiliary cobinders include the rosin esters which can be uniformly dispersed in the aqueous vehicle (e.g., rosin esters which are soluble or held in uniform dispersion or suspension by the aqueous vehicle). Illustrative rosin ester derivatives having relatively low softening points (e.g., usually less than 95°C.), frequently referred to as the soft rosins, include the methyl and hydrogenated methyl esters of rosin, ethylene and diethylene glycol esters of rosin, ethylene, triethylene, diethylene glycol hydrogenated esters of rosin, ethylene and diethylene glycol esters of polymerized rosin, glycol esters of rosin and glycerol esters of hydrogenated rosin. Illustrative hard rosin derivatives (e.g., exhibiting softening points above 95°C. and usually between 100°C–185°C.) include glycerol esters of polymerized rosins, maleic-modified ester gums, pentaerythritol esters of rosin, modified pentaerythritol esters of rosin, etc. Comparatively, the soft rosin derivatives are generally more compatible with a broader spectrum of film formers than the hard rosin derivatives. The hard resin derivatives are generally incompatible with most film formers and possess inherent film brittleness. These adverse properties severly restrict their functionality as a film former. Since the aqueous vehicles herein are compatible with the hard rosin derivatives, the hard rosin derivatives can be used in conjunction with the present vehicle in coating and color imparting formulations. Dried films prepared from such coating and color imparting formulations exhibit significantly improved film hardness without being brittle.

The aqueous vehicles of the invention are generally compatible with water miscible organic oxygenated solvents such as the alcohols (e.g., methyl alcohol, ethyl alcohol, isopropylalcohol, n-propyl alcohol, secondary butyl alcohol, n-butyl alcohol); the organo ester solvents such as methyl acetate, ethyl acetate, isopropyl acetate, n-propyl acetate, secondary butyl acetate, methyl ethyl ketone, methyl butyl ketone, dioxane, mixtures thereof and the like. The glycol ethers such as methyl Cellosolve, butyl Cellosolve are not completely compatible with the aqueous vehicles of the present invention. When organic, water-miscible polar solvents are employed in preparing the coating and color imparting compositions, water is employed as the major vehicle solvent with the total amount of organic solvent being preferably less than about 10% by weight of the water.

If it is desired to improve upon certain film properties (e.g., solvent resistance, tensile strength, heat distortion, hardness, adhesion, etc.), crosslinking agents may be incorporated into the aqueous ink formulation. Thermoset crosslinking agents as well as those which are reactive under ambient conditions may be employed. Conventional crosslinking agents reactive with nitrogen group containing monomers such as acrylamide, methacrylamide, iminol methacrylate, etc. (e.g., those having amide and aziridinyl functional groups) are generally suitable for this purpose. Illustrative crosslinking agents include formaldehyde, hydroxyl urea formaldehyde, melamine-formaldehyde, epoxy carboxyl anhydrides, mixtures thereof and the like.

In general, the incorporation of slip agents will improve upon the efficacy of the printing inks. Slip agents conventionally employed in the art to increase rub resistance, to decrease coefficient of friction and to a minor degree to contribute to the ink film hardness or thoughness may be used for this purpose. Natural vegetable, petroleum and synthetic waxes are illustrative waxes conventionally employed as slip agents. The slip agents generally are utilized at a level of about 0.5% to about 3.5% of total weight of finished inks. Typical waxes (usually reduced to the appropriate particle size for ink formulations) include Carnuba wax, beeswax, paraffin waxes, microcrystalline waxes, Fischer-Tropsch waxes, polyethylene waxes, mixtures thereof and the like. As recognized by the art, the amount of slip agent required to impart the desired effect can vary considerably (e.g., type of printing, substrate, pigments, etc.). These waxes may be incorporated into the base stock or added to the final ink formulation.

If desired, other conventional ink additives such as non-offset agents, non-scum agents, anti-pinhole agents, tack reducing agents, driers, etc. may be also included. Greater latitude with regard to the divergent ink ingredients is achieved because of the aqueous vehicles broad spectrum of compatability and unusual suspending properties.

The fountain inks (which is the ink preparation ultimately employed in printing and often referred to as press-ready ink) can vary considerably in solids and pigments content as well as its physical properties. Fountain inks containing organic coloring agents as the major colorant (on a weight basis) will generally have a total dry solids content between about 40% to about 55% by weight. The preferred range for the organic pigmented fountain inks is about 45 to about 50 weight percent. The pigment to binder weight ratio in these organic colorant based fountain inks will generally range between about 1:2 to about 1:1 and most preferably between about 3:5 to about 4:5.

When the major colorant (on a total dry solids coloring agent weight basis) is an inorganic color imparting agent (e.g., inorganic pigments), the fountain inks are formulated to a higher solids level. Illustrative fountain inks wherein the inorganic colorant is the major colorant ranges from at least about 55% to about 80% by weight total dry solids. Exceptional ink properties are obtained when the total dry solids content of the inorganic inks is within the range of about 65% to about 75% of the total dry solid weight. These inorganic pigmented fountain inks have been found to provide satisfactory printability when the pigment to binder weight ratio ranges from about 3:2 to about 5:2. Exceptional results are achieved when the pigment to binder ratio ranges between 9:5 to 2:1.

The fountain inks or press-ready inks herein are generally characterized as having a No. 2 Zahn cup reading within the range of at least 25 to about 50 seconds. Those inks formulated to a total dry solids content of about 40 to about 55% by weight will have a No. 2 Zahn cup reading generally between about 25 to about 40 and preferably between about 30 to about 35 seconds. At the high dry solids level (i.e., 55–80%), the No. 2 Zahn cup reading will normally be between about 25 to about 40 range while those at the 60% to 70% dry solids level are within the about 30 to about 35 seconds, No. 2 Zahn cup range. The aforementioned Zahn cup readings and ink characteristics can easily be achieved by diluting the base ink stocks and other required ink additives with the appropriate amount of water.

The fountain inks disclosed herein are particularly well adapted for the water-type rotogravure and water-type flexographic printing process. Pervious, cellulosic substrates such as paper and paperboard stocks (e.g., the paperboard containers, towels, bags, corrugated boxes, lightweight folding carbons, stationery, labels, wallboard liners, trading stamps, gift wrap, etc.) provide particularly good printing substrates for these fountain inks. According to accepted printing practice, the fountain inks of the present invention may be applied to a suitable printing member, impregnated upon the cellulosic substrate and permitted to dry and thus provide a printed cellulosic substrate. The application of heat (e.g., heated rolls, air drying, microwave ovens, etc.) immediately after depositing of the ink upon the substrate has been found to further enhance the dry and wet-rub resistance of the resultant printed article.

In another aspect of the invention, the aqueous vehicles may be utilized as an overprint varnish for printed cellulosic substrates such as paper and paperboard. As an overprint varnish, the cellulosic substrates may be previously printed with ink compositions containing the aqueous vehicles herein or alternatively be printed with printing inks which do not contain the aqueous vehicle of the present invention. When used as an overprint varnish, a cellulosic substrate is printed with any suitable printing ink with the aqueous vehicle herein being applied over the surface of the printed article as continuous film which upon drying will provide a cellulosic printed substrate having the aqueous vehicle as an overprint varnish.

When the aqueous vehicle herein is utilized as an overprint varnish, the natural, petroleum and synthetic waxes (mentioned hereinbefore as slip agents) are particularly useful as overprint varnish adjuncts. Dried films obtained from the aqueous vehicle and formulated with wax adjuncts possess significantly improved dry-scuff resistance and non-blocking properties in comparison to those prepared from the aqueous vehicle per se. The amount of wax incorporated into the aqueous vehicle should be sufficient to impart the desired dry-scuff resistance and non-blocking properties to the dried film. Based upon the total weight of the aqueous vehicle disclosed herein, the amount of wax in the final overprint varnish (i.e., as applied to the substrate) may range from about 0.5% by weight to about 5% by weight and preferably about 1% to about 3% by weight. The wax adjunct is most suitably thoroughly admixed with the aqueous vehicle to provide a homogeneous mixture of the wax and aqueous vehicle. Due to the water-soluble adducts ability to uniformly suspend the dispersed lipophilic materials in a highly concentrated form, the adducts may be used as a wax carrier. This characteristic makes the styrene polymer dispersion particularly useful as a liquid wax concentrate which may be diluted by the ink or overprint varnish formulator to the appropriate level. Unlike conventional aqueous vehicles which cannot effectively contain more than about 30% by weight wax solids, the vehicles herein can effectively carry from about 30% to 50% or more wax solids. The wax-aqueous vehicle concentrates may contain from about 50% by weight to about 80% by weight total wax and aqueous vehicle solids with excellent results being achieved at about the 60% to 75% by weight total dry solids level. Typical aqueous vehicle dry solids to wax solids (e.g., microcrystalline) ratios range from about 1:1 to about 1:3 and preferably at about a 1:2 weight ratio. High speed dispersing mixers may be used to homogeneously disperse the wax in the aqueous vehicle.

It is desired to utilize the aqueous vehicle as overprint varnish for dry cellulosic substrates and/or dry inks and/or wet, non-oil based inks, a homogeneous admixture of the wax adjunct and aqueous vehicle will provide unexpectedly superior overprint varnishes. However, if an overprint varnish for wet, oil-based ink substrate is desired, additional ingredients should be formulated therewith. The wetting characteristics of the aqueous vehicle upon the surface of wet, oil-based inks is significantly improved by anionic surface active agents. An anionic, surface active agent in an amount ranging from about 0.5% to about 5% by weight (based on the total aqueous vehicle weight) is generally sufficient for this purpose. Excellent overprint varnish formulations are achieved when the amount of surface active agent provided therein ranges from about 1% to less than 3% by weight of the total aqueous vehicle weight. The alkali metal salts of the diester of dibasic acids having ester groups of 8–14 carbon atoms, such as sodium dioctyl sulfosuccinte, sodium dodecyl sulfosuccinate, etc., impart exceptional wetting properties to overprint varnish formulations which are adapted for use in coating wet, oil-based ink substrates. Further improvements in overprint varnishes (adapted for use in coating wet oil-based substrates) are achieved by the inclusion of a plasticizing agent. Illustrative plasticizing agents include ethylene glycol, propylene glycol, benzyl glycol, diethylene glycol, mixtures thereof and the like. In addition to imparting plasticizing properties these plasticizing agents retard the drying rate and improve its application properties. Another useful coadjunct in overprint varnish formulations (adapted for use in coating wet, oil-based inks) is a dispersing agent. Lecithin, other similar phosphatides, and fatty acid esters impart flexibility to the dried film and facilitate uniform dispersion of the overprint varnish additives. In general the amount of dispersing agent and plasticizer will normally range from about 0.5% to 5% by wieght (based on total aqueous vehicle weight) and preferably from about 1% to about 3% by weight.

Included among the dvantages of the fountain inks herein are: minimum press-ready time, fast image plate change, adaptability to high printing speeds, solid color coating, a faster drying ink, adaptability to both sheet and web feed stock, distinctive clear prints on both solids and screen work, excellent ink transfer and wet-rub resistance, good printability on natural kraft and/or oyster clay coated and/or bleached liners, wide range of available color hues, efficient and easy ink handling, elimination of fumes fire hazards and odors, excellent press stability, high vehicle solids at a low viscosity, improved gloss and high pigment loading.

The following examples are illustrative of the invention.

EXAMPLE 1

Preparation of the Aqueous Vehicle

A. Maleation

The below mentioned ingredients were utilized to prepare the aqueous vehicle.

| Ingredients | % by Weight |
|---|---|
| Maleic Anhydride Briquettes | 11.90 |
| Linseed Oil, Archer X Grade (ADM) (0.35 ppm max. iron content) | 27.79 |
| Defoamer, Balab 748 (Witco Chemical) | 0.07 |
| Ammonium Hydroxide, Technical Grade (28% NH$_3$) | 11.58 |
| Water | 48.66 |

Maleic anhydride is loaded into a feed vessel equipped with heating means. Residual air was removed from the feed vessel by vacuum. The maleic anhydride was heated to 140°–150°F. and pressurized to 30 psig with nitrogen. The reaction vessel was loaded with the linseed oil. Nascent air was removed from the reaction vessel by heating the linseed oil to 225°F., applying a vacuum of 25–28 in. mercury, pressurizing to zero psig with nitrogen and reapplying a vacuum to 25–28 in. mercury. With continual heating (to 410°F.) and mechanical agitation, the maleic anhydride was slowly metered into the reaction vessel. When the exothermic reaction had raised the temperature to 425°F., it was cooled sufficiently to maintain the reactants within the vessel at a temperature between 425°F.–445°F. During the reaction, the pressure was maintained at slightly less than 15 psig. If difficulty in maintaining the reactions within the 425°F–445°F. range should occur, feeding of the maleic anhydride can be temporarily discontinued for a period of time sufficient to arrest the exothermic reaction. Upon completion of the maleic anhydride feeding, the reactants were then maintained at 425°F–435°F. for an additional 2 hours at a pressure of 25–30 psig. The reaction product was tested for its anilic acid number[1] and found to be within the acceptable 149–166 range. The reaction product was cooled to 230°–240°F. and held under 15 psig nitrogen.

1 — A.O.C.S. method Tc 1a–64

B. Preparation of the water soluble ammonium salt of amic acid - oil adduct

A uniform admixture of the water and defoamer was placed into a separate vessel. The ammonium hydroxide was then introduced. The reaction product of Example 1(A) (held above at 230°–240°F) was added, and the mixture stirred for 30 minutes. The resultant aqueous solution of solubilized oil adduct should be at pH 8.0 ± 0.2. If below pH 7.8, it is adjusted to pH 8.0 with additional ammonium hydroxide. The resultant solubilized oil adduct was strained through a 150 micron nylon cloth and used in preparing the aqueous vehicle of 1(C) below. The dry solids content will normally be at approximately 43%, pH 7.8–8.4 and have a viscosity of 400–1000 cps. (Brookfield at 77°F. and No. 3 spindle at 20 rpm).

C. Aqueous Vehicle Preparation

The following ingredients were utilized in preparing the aqueous vehicle:

| | Ingredients | % by Weight |
|---|---|---|
| (I) | Water | 4.74 |
| | Solubilized Linseed oil of 1(B) above | 40.06 |
| | Styrene | 37.10 |
| (II) | t-Butyl Hydroperoxide | 0.32 |
| (III) | Erythorbic Acid | 0.09 |
| | Water | 17.67 |

The polymerization reactor was charged with hot water (I), sealed, and depressurized to a vacuum of 27–28 inches. The t-butyl hydroperoxide (II) was placed in the catalyst feed tank. The solubilized linseed oil adduct was then introduced into the polymerization reactor while maintaining the reactor vessel contents at 170°F. Thereafter, 12% of the total styrene was introduced into the reactor maintained at 170°F. ± 2°F. Twenty-five percent of the t-butyl hydroperoxide (II) was charged to the polymerization reactor vessel, and the mixture was mixed for 10 minutes. Ten percent of the erythorbic acid solution III was charged to the polymerization reactor vessel whereupon the polymerization medium temperature increased to 180°–190°F. While maintaining the polymerization reactor temperature at 180°F. ± 2, the remaining portions of the styrene, t-butyl hydroperoxide and erythorbic acid solution was simultaneously and continuously admitted. The styrene and t-butyl hydroperoxide rates were regulated so as to maintain the polymerization reaction temperature at 180°F. ± 2°. After approximately 2 to 3 hours feed time, the styrene and t-butyl hydroperoxide additions were completed. The feed rate of the erythorbic acid solution was adjusted to complete its addition 30 minutes after the completion of the styrene and t-butyl hydroperoxide additions. Upon completion of the erythorbic acid feed, the polymerized product was maintained at 180°F ± 2° for an additional hour. the resultant aqueous vehicle was then cooled and strained through an 80 mesh nylon screen.

A typical analysis of aqueous vehicle prepared in accordance with this Example 1 is:

| | |
|---|---|
| Residual styrene[2] monomer | 0.15% |
| Total dry solids[3] | 55% |
| pH | 8.0 |
| Brookfield Viscosity at 77°F. (20 rpm No. 3 Spindle) | 7,500 cps |
| Sediment (on U.S. No. 80) | None |
| Initial viscosity[4] of standard ink at 77°F., No. 2 Zahn cup | 17 seconds |
| Viscosity increase on aging[4] | 15% max. (Usually less than 5%) |
| Average styrene particle size[5] | 0.16 micron |

[2]Styrene is determined by extraction from the polymer dispersion with benzene, injection of the benzene extract into a gas chromatograph for separation of the styrene, and measured by comparison against a standard containing a known amount of styrene.
[3]The dry solids are determined by drying a known weight of the aqueous vehicle in a forced draft oven at 100° ± 1°C. for exactly four hours and weighing the residue to ± 0.01 gram.
[4]A standard ink is prepared using a set amount of pigment and a set amount of aqueous vehicle solids. This mixture is ground to a zero reading on a fineness of grind gauge (Precision Gage & Tool Co., Dayton, Ohio) using 1/8" stainless steel shot in a Red Devil paint conditioner (Red Devil, Inc., Union, New Jersey). Initial viscosity of the standard ink is measured to ± 0.1 second at 25°C. with a No. 2 Zahn cup (Sargent-Welch Scientific Co.). The ink is stored in a sealed container for 72 hours at 25°C. Settled pigment is resuspended by stirring with a spatula and the viscosity is rerun. This second measurement is the aged viscosity.
[5]The determination of the average particle size of synthetic latices by turbidity measurements, Arnold B. Loabel, Official Digest, February, 1959, pages 200-213.

EXAMPLE 2

Preparation of single pigmented base colors

In the preparation of single pigmented base colors, the use of the aqueous styrene polymer dispersion as the grinding and dispersing vehicle allows high pigment loading. Exemplary thereof is the following:

| Type of Pigment | (Range) % Pigmentation | (Range) P/B Ratio |
|---|---|---|
| Organic | 20–30 | 1.0–1.8 |
| Inorganic | 50–80 | 1.0–5.0 |
| Typical | % Pigmentation | P/B Ratio |
| Organic | 25 | 1.5 |
| Inorganic | 60 | 3.5 |

The above pigmentation and P/B ratio produces a flowable base ink which will not body-up or thicken on prolonged storage.

| A — Organic base color | |
|---|---|
| Parts by Weight | Ingredients |
| 25 | 20-4200 barium lithol red (American Cyanamid) |
| 30 | Aqueous styrene polymer dispersion (55% solids) |
| 1 | Defoamer |
| 44 | Water    P/B Ratio 1.5 Pigmentation % – 25% |
| 100.0 | |

Grind the above ingredients in a sand mill for 35 minutes. The resultant organic pigmented base color was characterized as having a fineness of grind value of less than 3.0 by N.P.I.R.I. Grindometer (Precision Gage & Tool Co., Dayton, Ohio). The base color pigments were uniformly dispersed throughout the aqueous styrene polymer dispersion. Aging of base color under ambient conditions did not appreciably alter its excellent flow characteristics.

| B — Organic base color | |
|---|---|
| Parts by Weight | Ingredients |
| 30 | 20-4200 barium lithol red (American Cyanamid) |
| 36.5 | Aqueous styrene polymer dispersion (55%) |
| 1 | Defoamer |
| 32.5 | Water    % Pigmentation 30% |
| 100.0 | P/B Ratio 1.5 |

The aforementioned ingredients were ground for 40 minutes in a sand mill. The resultant organic base color possessed properties as in 2(A) above.

| C — Inorganic base color | |
|---|---|
| Parts by Weight | Ingredients |
| 60 | No. 2737 chrome yellow (Harshaw Chemical Co.) |
| 31 | Aqueous styrene polymer dispersion (55%) |
| 1 | Defoamer |
| 8 | Water    % Pigmentation 60% P/B Ratio 3.5 |
| 100.0 | |

Grind for 30 minutes as in 2(A) above. Similar results as in 2(A) above were observed.

| D — Inorganic base color | |
|---|---|
| Parts by Weight | Ingredients |
| 65.0 | Titanium dioxide RA-48 (E. I. duPont) |
| 32.6 | Aqueous styrene polymer dispersion (55%) |
| 1.0 | Defoamer |
| 1.4 | Water    % Pigmentation 65% P/B Ratio 3.6 |
| 100.0 | |

The aforementioned 2(D) ingredients were ground as in 2(B) above. The excellent base color results of 2(A) above were obtained.

E — Inorganic finished ink formulations

The following ingredients were blended together for three minutes.

| Parts by Weight | Ingredients |
| --- | --- |
| 23.5 | Aqueous styrene polymer dispersion (55%) |
| 8.5 | Water |
| 1.0 | Lecithin |
| 2.5 | Diethylene glycol |
| 1.0 | Defoamer |
| 36.5 | |

The aforementioned blend was placed in a sand mill and ground for 30 minutes while slowly adding 45 parts by weight of No. 2737 chrome yellow (Harshaw Chemical Company). Upon completion of the grinding, an additional 18.5 parts by weight of the aqueous styrene polymer dispersion (55%) was added to grind and thoroughly blended together for an additional five minutes. The finished inorganic ink (press-ready) possessed the following characteristics.

Total solids — 70%
P/B ratio — 1.9
Pigmentation — 45%
Viscosity 30–35 sec.
(No. 2 Zahn cup)

F — Finished organic ink formulation

| Parts by Weight | Ingredients |
| --- | --- |
| 31.0 | Aqueous styrene polymer dispersion (55%) |
| 17.5 | Water |
| 1.0 | Lecithin |
| 2.7 | Diethylene glycol |
| 4.2 | Ethanol |
| 1.0 | Defoamer |
| 57.4 | |

The aforementioned ingredients were thoroughly blended together by mixing for three minutes while slowly adding 18.1 parts by weight barium lithol red 20–4200 (American Cyanamid). The resultant blend was then ground for 30 minutes in a sand mill. Thereafter, 3.0 parts by weight water and 21.5 parts by weight of the aqueous styrene polymer dispersions (55%) was admixed therein by blending for an additional five minutes. The resultant inorganic finished ink possessed the following characteristics.

Total solids — 49%
P/B ratio — 0.62
Pigmentation — 18%
Viscosity — 30–35 sec.
(No. 2 Zahn cup)

G — Organic finished ink prepared from a single pigmented base color

| Parts by Weight | Ingredients |
| --- | --- |
| 68 | Example 2(A) above |
| 25 | Aqueous styrene polymer dispersion (55%) |
| 1 | Defoamer |
| 4 | Propylene glycol |
| 2 | Wax |
| 100 | |

Solids — 44%
P/B — 0.71
Pigmentation — 17%
Viscosity — 30–35 sec.
(No. 2 Zahn cup)
Mix ingredients together without grinding.

H — Organic finished ink using 2(B) base color

| Parts by Weight | Ingredients |
| --- | --- |
| 60 | Example 2(B) base color |
| 32.6 | Aqueous styrene polymer dispersion (55%) |
| 1.0 | Defoamer |
| 4.4 | Diethylene glycol |
| 2.0 | Wax |
| 100.0 | |

Blend together without grinding.

Properties

Solids — 50%
P/B — 0.6
Pigmentation — 18%
Viscosity — 30–35 sec.
(No. 2 Zahn cup)

I — Inorganic finished ink using color base 2(D)

Thoroughly mix ingredients together without grinding.

| Parts by Weight | Ingredients |
| --- | --- |
| 69 | Example 2(D) |
| 18.4 | Aqueous styrene polymer dispersion (55%) |
| 1.0 | Defoamer |
| 2.0 | Wax |
| 5.0 | Propylene glycol |
| 4.6 | Water |
| 100.0 | |

Properties

Solids — 69.5%
Pigmentation — 45.0%
P/B ratio — 2.0
Viscosity — 30–35 sec.
(No. 2 Zahn cup)

In preparing the base coloring agents and press-ready ink formulations, it has been observed that the aqueous styrene polymer dispersion imparts several distinct improvements over conventional water-type vehicles. The aqueous vehicles herein demonstrate good pigment wetting properties in the grinding of the organic and inorganic pigments. The inks exhibit low viscosity notwithstanding the high pigment loading. The addition of a small amount of ethanol (about 2%–5% by weight) may be used to further aid in pigment wetting and to increase the press-ready viscosity. Stability of the ink under mechanical shear and ambient storage was excellent. The freeze/thaw stability was greater than five cycles.

The aforementioned final ink formulations or press-ready inks were utilized in the printing of paper and paperboards. Rotogravure and flexographic printing processes were employed to print the substrates. Compared to other water-type ink formulations, the above press-ready inks exhibit a faster drying rate with superior solvent release characteristics. Excellent ink mileage was obtained. The wet-rub resistance was good. The dry printed articles possessed a high gloss, good organic solvent resistance and very good water resistance. The printed articles possessed intense coloring, sharper contrast and greater detail in comparison to the conventional aqueous vehicle press-ready inks. The stability against viscosity pH changes and ink component separation during the printing cycle was excellent. A higher boiling point amine may be added to further stabilize the pH. Transfer character of the inks from the printing member of substrate and wetting thereof was excellent. The dried printed articles had good film adhesion, toughness and strength.

Comparative to conventional water-type vehicles which contain bleeding dyes, the press-ready inks containing the aqueous vehicle have been found to exhibit significantly improved resistance towards water bleeding.

If a fast drying speed is desired, it is recommended water be used for press reduction. The drying rate of press-ready inks may be retarded by incorporating glycols such as ethylene, propylene, hexylene and diethylene glycols. These glycols will further improve the ink transfer properties.

EXAMPLE 3

The aqueous styrene polymer dispersion prepared in accordance with Example 1 was employed as an overprint varnish. When used as an overprint varnish, the characteristics of the aqueous styrene polymer dispersion are substantially the same as those described above in respect to press-ready inks with the exception that the color imparting agents are excluded. Although not necessary, the styrene polymer dispersion can be formulated with the conventional press-ready ink additives which are utilized to enhance its film forming adherence to cellulosic substrates and printability characteristics. Depending upon the type of equipment utilized in applying the aqueous dispersions to a printed cellulosic substrate, the dispersion dry solids is adjusted to the appropriate level to permit the coating of the printed cellulosic substrates therewith. Aqueous styrene polymer dispersion adjusted to a No. 2 Zahn cup viscosity of about 20 seconds to about 50 seconds (preferably between about 25 seconds to about 30 seconds) are generally suitable for use as a press-ready overprint varnish. The press-ready, overprint varnish may be applied to the printed cellulosic substrates by conventional overprint varnish means such as rubber transfer roller application, rotogravure and flexographic presses, etc. Heat drying will improve upon the overprint varnish coating characteristics. Using the aqueous styrene polymer, dispersion of Example 1 diluted with water to a No. 2 Zahn cup reading of 30 seconds, provides results similar to those obtained by the press-ready inks in Example 2.

EXAMPLE 4

A liquid wax concentrate employing the aqueous vehicle of Example 1 was prepared as follows:

| Ingredients | Concentrate 1 | 2 | 3 |
|---|---|---|---|
| Aqueous Vehicle (Ex. 1) | 650.0 | 325.0 | 417.0 |
| Water | 100.0 | 50.0 | 63.0 |
| Microcrystalline wax | 285.0[6] | 250.0[6] | 500.0[7] |
| Diethylene glycol | — | — | 20.0 |
| Total weight | 1135.0 | 625.0 | 1000.0 |
| % wax solids | 35% | 40% | 50% |
| % aqueous vehicle solids | 31% | 28.6% | 22.9% |

[6]"MP-22 wax" a micro wax (M.P. 215°–223°, congealing point 197°–205°, density 0.94. Avg. particle size 4 microns) sold by Micro Powders, Inc., 1730 Central Park Avenue, Yonkers, New York 10710.
[7]"MP-22VF wax" fine grind (2–3 gauge reading, see footnote 6 above).

A uniform homogeneous dispersion of wax concentrates 1, 2, and 3 were prepared using a high speed "Cowles Mixer".

The above wax concentrates provide a homogeneous, aqueous system, which can be conveniently added to press-ready inks and aqueous coating compositions without requiring further dilution with water of pH adjustments. Unlike conventional aqueous wax concentrates, (normally requiring 10% by weight alcohol or more), the wax concentrates herein (which may be substantially free from alcoholic dispersing aids) possess excellent compatibility and dispersibility in aqueous ink and coating formulations. The aqueous vehicles are especially adapted to maintain a higher wax concentration in uniform dispersion comparative to conventional aqueous vehicles.

EXAMPLE 5

An overprint varnish containing a micronized synthetic wax was prepared from the following ingredients:

| | Parts by Weight |
|---|---|
| Aqueous vehicle (Example 1) | 975 |
| Water | 93 |
| Lecithin (UF Grade) | 10 |
| Propylene Glycol | 20 |
| "Aerosol OT" (75% by weight) | 14 |
| Microcrystalline synthetic wax[8] | 10 |
| | 1122 |

[8]"M.P. 22-VF wax" - See footnote 7 above

In preparing the overprint varnish, the wax was uniformly blended together with the lecithin, propylene glycol and surface active agent. The 93 parts by weight water (sufficient to provide a final overprint formulation having a 25 second No. 2 Zahn cup viscosity) was added to the blend and thoroughly mixed in a high speed disperser for about 10 minutes to provide a homogeneous admixture thereof. The aqueous vehicle was then added to the admixture and thoroughly mixed for about 10–15 minutes to provide a homogeneous overprint varnish (No. 2 Zahn cup viscosity of 25 seconds).

Coated, paper label stock freshly printed with an oil-based, off set lithographic ink was overprinted with the Exmple 5 overprint varnish composition. The overprint composition was applied directly to the wet printed substrate via an Anilox-transfer roll (rubber impression roll) and immediately passed through a microwave oven. The printed substrate temperature was maintained at about 120°F. for about 2 seconds. This resulted in a label stock having a wet, oil-based printed surface which was protectively coated with a dried overprint varnish film. It was observed that the wet oil-based ink print needed approximately 24 hours drying under ambient conditions to completely dry. The aqueous overprint varnish composition exhibited good wetting properties upon the printed and unprinted surfaces of the label. Excellent leveling and coverage resulted without any pinholing being observed. Notwithstanding the wet character of the oil-based print, the initial overprint varnish surface coating did not indicate any signs of failure at 100–150 rubs (Sutherland rub test) with a four pound weight. After 24 hours, the Sutherland rub test indicated in excess of 600 rubs before failure. The gloss ranged from 88–92 at 75° angle (Gardner gloss meter). The printed and coated labels were devoid of any deformation or curling. The slip character of the overprinted labels was excellent.

EXAMPLE 6

A styrene dispersion (containing the water-soluble, glyceride, amic adduct salt as an external phase) was prepared pursuant to Example 1. The styrene dispersion possessed the following characteristics, 7.7 pH, viscosity 6,780 cps., 0.15 micron average styrene polymer particle size, 54.2% by weight dry solids and less than 0.2% monomeric styrene (on a total styrene dispersion weight basis). For comparative purposes, a fully hydrolyzed salt adduct, water dispersible interpolymer was prepared in accordance with Example III of U.S. Pat. No. 2,941,968. This product possessed the following characteristics: pH 10.1, average particle size 0.14 micron, residual styrene monomer 2.15% and 49.3% by weight dry solids. Analysis of the U.S. Pat. No. 2,941,968 product (a fully hydrolyzed salt adduct) indicated almost complete conversion of the maleic anhydride moieties to the dicarboxylic acid form. In contrast, the external, aqueous amic adduct salt phase effectively maintained a uniform and homogeneous dispersion of the styrene polymer particles therein.

The viscosity (initial and aged), gloss and wet-rub characteristics were then determined for amic salt-styrene dispersion and fully hydrolyzed salt adduct dispersion by diluting the samples to a 25% solids level with aqueous ammonium hydroxide to a respective pH of 8.8 and 8.4. A pigmented test sample was then prepared by grinding 85 grams of the diluted vehicles with 15 grams of Barium lithol[4]. The gloss, wet-rub and viscosity (fresh and aged) for both test samples were good.

4 — supra

Comparative tests were made upon the fully hydrolyzed adduct salts and the amic adduct salts to determine their pigment loading and pigment grinding characteristics. All base ink formulations were ground for 18 hours in a ball mill using ⅝ in. steel balls. The ingredients used and results are recorded in Tables II and III.

TABLE II

| | ORGANIC PIGMENT BASE INKS | | | | | | | |
|---|---|---|---|---|---|---|---|---|
| | U. S. Patent No. 2,941,968 Vehicle | | | | Styrene dispersion (amic adduct salt) | | | |
| RUN | A | B | C | D | E | F | G | H |
| Ingredients | | | | | | | | |
| Barium Lithol (American Cyanamid 20-4200) | 62.50 | 62.50 | 62.50 | 100.0 | 62.50 | 62.50 | 62.50 | 100.0 |
| Aqueous Vehicle Weight | 127.00 | 83.75 | 65.25 | 61.00 | 115.75 | 76.25 | 57.50 | 55.75 |
| Water | 58.00 | 101.25 | 119.75 | 86.50 | 69.25 | 108.75 | 127.50 | 91.75 |
| Defoamer (Balab 748) | 2.50 | 2.50 | 2.50 | 2.50 | 2.50 | 2.50 | 2.50 | 2.50 |
| Total Weight | 250.00 | 250.00 | 250.00 | 250.00 | 250.00 | 250.00 | 250.00 | 250.00 |
| % Pigmentation | 25.0% | 25.0% | 25.0% | 40.0% | 25.0% | 25.0% | 25.0% | 40.0% |
| P/B Ratio | 1.0/1.0 | 1.5/1.0 | 2.0/1.0 | 3.3/1.0 | 1.0/1.0 | 1.5/1.0 | 2.0/1.0 | 3.3/1.0 |
| % Total Solids | 50.0% | 41.5% | 37.9% | 52.0% | 50.0% | 41.5% | 37.5% | 52.0% |
| | | | | RESULTS | | | | |
| Pigment wetting | Good | Good | Good | Very Poor[9] | Good | Good | Good | Good[10] |
| Fineness of Grind | Failed (heavy paste) | 2 | 2 | — | 1 | 1 | 0 | 3 |
| No. 2 Zahn cup viscosity | — | 27.5 | 20.8 | — | 35 | 19.0 | 17.5 | 35.5 |

[9]At a 3.0/1.0 P/B ratio with 52.0% total solids, the pigment would not wet out, lumped and formed dry aggregates.
[10]At a 52.0% total solids with P/B ratio of 3.0/1.0 wetted pigment well and gave a flowable material. For grinding it was reduced to 48% total solids level.

TABLE III

| | INORGANIC PIGMENT BASE INKS | | | | | | | |
|---|---|---|---|---|---|---|---|---|
| | U.S. Pat. No. 2,941,968 | | | | Styrene Polymer Dispersion (Amic Adduct Salt) | | | |
| RUN | I | J | K | L | M | N | O | P |
| Ingredients | | | | | | | | |
| Molybdate orange | 150.00 | 150.00 | 150.00 | 204.00 | 150.00 | 150.00 | 150.00 | 204.00 |
| Vehicle Weight | 123.00 | 91.50 | 73.50 | 82.20 | 111.00 | 83.10 | 66.60 | 74.70 |
| Water | 24.50 | 56.00 | 74.00 | 11.30 | 36.50 | 64.40 | 80.90 | 18.80 |
| Defoamer | 2.50 | 2.50 | 2.50 | 2.50 | 2.50 | 2.50 | 2.50 | 2.50 |
| Total Weight | 300.00 | 300.00 | 300.00 | 300.00 | 300.00 | 300.00 | 300.00 | 300.00 |
| % Pigmentation | 50.0% | 50.0% | 50.0% | 68.0% | 50.0% | 50.0% | 50.0% | 68.0% |
| P/B Ratio | 2.5/1.0 | 3.3/1.0 | 4.2/1.0 | 5.0/1.0 | 2.5/1.0 | 3.3/1.0 | 4.2/1.0 | 5.0/1.0 |
| % Total Solids | 70% | 65% | 62% | 81.5% | 70% | 65% | 62% | 81.5% |
| | | | | RESULTS | | | | |
| Pigment wetting | Good | Good | Good | Very Poor[11] | Good | Good | Good | Good[12] |
| Fineness of Grind | Failed (paste) | 3 | 2 | — | 2 | 2 | 1 | 2 |
| No. 2 Zahn cup viscosity | — | 21.5 | 19 | — | 35.5 | 25 | 23 | 54 sec. |
| No. 3 Zahn cup viscosity | — | — | — | — | — | — | — | 23 sec. |

[11]At P/B ratio of 5.0/1.0 — total solids of 81.5 would not wet pigment and formed dry aggregates.
[12]At P/B ratio of 5.0/1.0 — total solids of 81.5 wet pigment and gave a flowable material. For grinding it was reduced to 48% solids level.

The data recorded above in Tables II and III illustrate the superior wetting, high pigment loading and grind characteristics of the aqueous vehicle containing the glyceride amic adduct salts as an external phase. These characteristics provide greater compatibility with a broad spectrum of lyophilic and hydrophilic materials (included suspended solids). These characteristics are highly desirable for water-type inks.

Since many embodiments of this invention may be made and since many changes may be made in the embodiments described, the foregoing is to be interpreted as illustrative only and our invention is defined by the claims appended hereafter.

We claim:

1. An aqueous printing ink composition suitable for use under ambient printing conditions and containing uniformly dispersed throughout the ink composition a polymer dispersion as a principle ink vehicle on a weight basis, said printing ink composition comprising an admixture of:
   A. a polymer dispersion comprising:
      a. a continuous, aqueous external phase consisting essentially of an adduct reaction product of an unsaturated glyceride oil and at least one dicarboxylic acid selected from the group consisting of an alpha, beta-ethylenically unsaturated dicarboxylic acid and an alpha, beta-ethylenically unsaturated dicarboxylic acid anhydride, said adduct reaction product being reacted with an aqueous solution of a nitrogen base having at least one reactive hydrogen moiety, in an amount sufficient to provide a water-soluble salt reaction product having a pH within the range of 7.0 to 10.0,
      b. a non-continuous, internal phase of minute, polymerized monovinyl aromatic polymer particles having an average particle size of less than 0.4 micron uniformly dispersed within said external phase,
      said polymer dispersion being further characterized as containing (on total dry weight basis) at least 40% by weight of said external phase and said internal phase, and at least one part to less than four parts external phase dry solids for each six parts by weight of dry internal phase solids, and
   B. a color imparting agent of at least one member selected from the group consisting of an organic color agent and an inorganic coloring agent with the proviso that when the major coloring agent (on a total dry solids coloring agent weight basis) is an organic coloring agent, the ink composition contains from at least one part by weight to less than four parts by weight organic coloring agent for each four parts by weight polymer particles dry solids, and that when the major coloring agent (total dry solids coloring agent weight basis) is an inorganic coloring agent, the ink composition contains from about 1 to about 8 parts by weight inorganic coloring agent for each two parts by weight of dry polymer dispersion solids,
said ink composition being further characterized as containing at least 30% by weight dry solids and a sufficient amount of (A), (B), ink additives and water to provide a No. 2 Zahn cup reading of between about 15 to about 50 seconds, with the further proviso that when the ink composition contains organic coloring agents as a major coloring agent (on a weight basis), the total dry solids content of said printing ink composition ranges from about 30% to about 55% and when the inorganic coloring agents are a major coloring agent, the total dry solids content of said ink composition ranges from at least 45% to about 80% by weight.

2. The printing ink composition according to claim 1 wherein the ink is characterized as having a No. 2 Zahn cup value between about 25 seconds to about 40 seconds.

3. The printing ink composition according to claim 2 wherein the water-soluble adduct of the external phase consists essentially of the reaction product of a glyceride anhydride and a nitrogen based characterized as having at least one hydrogen atom contiguously attached to a nitrogen atom.

4. The printing ink composition according to claim 3 wherein the average particle size is within the range of 0.05 micron to less than 0.25 micron, the polymer particles consist essentially of from about 50% by weight to 100% polymerized styrene, about 0 to about 50% polymerized vinyl toluene and 0 to 10% by weight of another polymerized monoethylenically unsaturated monomer other than styrene and vinyl toluene.

5. The printing ink composition according to claim 4 wherein the glyceride oil is a drying oil and consists essentially of a maleic anhydride oil adduct in a molar ratio of at least 2.5 moles to about 3.5 moles of maleic anhydride for each mole of glyceride oil.

6. The printing ink composition according to claim 5 wherein the major ink coloring agent (weight basis) is an organic coloring agent, the dry solids content is within the range of about 40% by weight to about 45% by weight, the pigment of binder weight ratio is from about 3:5 to about 4:5 and the adduct is reacted and neutralized with a volatile nitrogen base to a pH between about 7.5 to about 8.5, and said volatile base is further characterized as having a boiling point at atmospheric pressure of less than 20°C.

7. The printing ink composition according to claim 6 wherein the polymer particle consists essentially of polystyrene particles having an average particle size of between 0.1 to 0.2 micron.

8. The printing ink composition according to claim 7 wherein the No. 2 Zahn cup value for the press ready ink composition ranges from about 25 to about 35 seconds and the glyceride oil is at least one drying oil selected from the group consisting of linseed, soybean, cottonseed, safflower, corn and tung oil.

9. The printing ink composition according to claim 4 wherein the major ink coloring agent is an inorganic coloring agent, the dry solids content is within the range of about 65% to about 75% by weight, and the adduct is reacted and neutralized with a nitrogen base to a pH between about 7.5 to about 8.5.

10. The printing ink composition according to claim 9 wherein the polymer particle consists essentially of polystyrene particles having an average particle size of between 0.1 to 0.2 microns.

11. The printing ink composition according to claim 10 wherein the No. 2 Zahn cup value for the press ready ink composition ranges from about 25 to 35 seconds, the glyceride oil is at least one drying oil selected from the group consisting of linseed oil and soybean oil, and the nitrogen base consists essentially of ammonium hydroxide.

12. An aqueous polymer dispersion possessing film-forming characteristics under drying conditions and adaptable for use as an aqueous printing vehicle, said polymer dispersion comprising:

a. a continuous, aqueous external phase consisting essentially of a water-soluble amic acid salt of an unsaturated oil anhydride adduct, wherein the adduct is reacted and neutralized with an aqueous nitrogen base in an amount sufficient to provide a water-soluble, amic acid salt reaction product having a pH within the range of 7.0 to 10.0, and b. a non-continuous, internal phase of minute, polymerized monovinyl aromatic polymer particles having an average particle size of less than 0.4 micron uniformly dispersed within said external phase.

said polymer disperson being characterized as containing at least one part to less than four parts external phase dry weight solids for each six parts by weight dry internal phase solids, the total dry solids weight of said external phase and said internal phase being at least 40% with the remaining non-solids portion of said polymer dispersion consisting essentially of water, said polymer dispersion being further characterized as containing (on a total polymer dispersion weight basis) less than 0.5% by weight unpolymerized monvinyl aromatic monomer and based upon the polymer particle dry weight less than 3% by weight nonionic and anionic surface active agents.

13. The aqueous polymer dispersion according to claim 12 wherein the adduct is neutralized to a pH between about 7.5 to about 8.5 and (on a total weight nitrogen base weight basis) the major nitrogen base is a volatile base characterized as having a boiling point of less than 20°C. at atmospheric pressure.

14. The polymer dispersion according to claim 12 wherein the adduct is characterized as having from at least 2 moles to about 4.5 moles amic salt substituents per mole of glyceride oil.

15. The polymer dispersion according to claim 14 wherein the average polymer particle size is within the range of 0.05 micron to less than 0.25 micron and the polymer particles consist essentially of from about 50% by weight to 100% polymerized styrene, about 0 to about 50% by weight polymerized vinyl toluene and 0 to 10% by weight of another polymerized monoethylenically unsaturated monomer other than styrene and vinyl toluene.

16. The aqueous polymer dispersion according to claim 12 wherein the adduct consists essentially of the reaction product of a maleic anhydride and a glyceride oil in a molar ratio of at least 2.5 moles to about 3.5 moles of maleic anhydride for each mole of glyceride oil.

17. The aqueous polymer dispersion according to claim 16 wherein the glyceride oil is at least one drying oil selected from the group consisting of linseed oil and soybean oil.

18. The aqueous polymer dispersion according to claim 17 wherein the polymer particles consist essentially of at least one polymerized monomer selected from the group consisting of styrene and vinyl toluene with styrene on a weight basis being the major polymerized monomer.

19. The aqueous polymer dispersion according to claim 17 wherein the adduct is reacted and neutralized with ammonium hydroxide to a pH of between 7.6 to 8.2, the total dry solids weight of said external phase solids and said internal phase solids is greater than about 50% by weight to about 60% by weight.

20. The aqueous polymer dispersion according to claim 19 wherein the polymer dispersion consists essentially of styrene homopolymer particles having an average particle size within the range of 0.1 micron to 0.2 micron and the free styrene monomer content is less than about 0.4% by weight of the total aqueous styrene polymer dispersion weight.

21. The aqueous polymer dispersion according to claim 20 wherein the viscosity of the dispersion at a 55 ± 2% total dry solids level ranges from about 4000 cps. to 7000 cps. and the dispersion is further characterized as having a viscosity of less than 50 cps. when diluted with water to a total dry solids weight content of 40%.

22. The aqueous polymer dispersion according to claim 21 wherein the total weight of surface active agent exclusive of the amic acid salt adduct is less than 1.6% by weight of the total styrene particles weight.

23. A process for preparing an aqueous polymer dispersion having an aqueous external phase of a water-soluble, glyceride oil amic acid salt adduct and an internal phase of minute vinyl aromatic polymer particles uniformly dispersed therein, said process being conducted under conditions sufficient to provide a dry solids content of at least 45% by weight and a free monovinyl aromatic monomer content of less than 0.7% by weight of the total aqueous dispersion weight, said process comprising the steps of:

A. reacting an unsaturated glyceride oil and at least one dicarboyxlic acid selected from the group consisting of an alpha, beta-ethylenically unsaturated dicarboxylic acid which forms an anhydride glyceride adduct and an alpha, beta-ethylenically unsaturated dicarboxylic acid anhydride under adduct reaction conditions sufficient to provide an oil adduct containing at least 2 moles to about 4.5 moles of anhydride moieties for each mole of glyceride oil, B. neutralizing the oil adduct with an aqueous nitrogen base charactertized as containing at least one hydrogen atom continguously attached to a nitrogen atom to a pH of greater than 7.0 but less than 10.0 and thereby providing a water-soluble, amic acid salt of said oil adduct, C. initiating the polymerization of the internal phase in a polymerization media comprised of at least a portion of the water-soluble, amic salt of said adduct and a monovinyl aryl monomer, D. incrementally adding additional monovinyl aryl monomer and polymerization catalyst at a predetermined rate to the polymerization media while maintaining the temperature of the reaction media at a temperature of less than 200°F., and E. continuing the polymerization of monovinyl aryl monomer under conditions of (D) above for a period of time sufficient to provide an aqueous polymer dispersion containing less than 0.7 unpolymerized monovinyl aryl monomer and a weight ratio of water-soluble adduct to polymerized monomer constituents of 1:3 to about 2:3.

24. The process according to claim 23 wherein the dicarboxylic acid consists essentially of maleic anhydride in an amount ranging from about 2.5 to about 4.0 moles per mole of unsaturated glyceride oil.

25. The process according to claim 24 wherein the glyceride oil is a drying oil having an average degree of ethylenically unsaturation ranging from about 3 to about 9 groups per molecule of glyceride oil.

26. The process according to claim 25 wherein the polymerization temperature is maintained between 140°F. to 190°F. and the monovinyl aryl monomer comprises at least 50% of the total polymerized monomer weight and from 0 to 50% by weight of another monoethylenically unsaturated monomer.

27. The process according to claim 26 wherein the monovinyl aryl monomer is at least one member selected from the group consisting of styrene and vinyl toluene, and styrene on a weight basis comprises at least a major portion of the monovinyl aryl monomer.

28. The process according to claim 27 wherein step (E) is conducted for a period of time sufficient to provide an aqueous styrene polymer dispersion containing less than 0.5% by weight styrene monomer and the dry solids weight content of said aqueous dispersion is at least 50% to less than 60% by weight with the balance thereof consisting essentially of water.

29. The process according to claim 27 wherein the catalyst is an organic hydroperoxide.

30. The process according to claim 29 wherein the polymerization of the residual monomers is conducted in the presence of an organic hydroperoxide and the promoter is at least one member selected from the group consisting of ascorbic acid and erythorbic acid.

31. The process according to claim 30 wherein polymerizable monomers admitted to the polymerization media is comprised of at least 90% by weight styrene and from 0-10% by weight of an other monoethylenically unsaturated monomers other than styrene.

32. The process according to claim 31 wherein polymerization temperature is maintained between about 175°F. to about 185°F. and the polymerization of residual monomers is continued in the presence of the organic hydroperoxide catalyst and promoter for a period of time sufficient to provide an aqueous dispersion containing less than about 0.35% by weight unpolymerized styrene.

33. The process according to claim 31 wherein exclusive of the water-soluble amic salt adduct, the polymerization is conducted under conditions substantially free from anionic and non-ionic surface active agents.

34. The process according to claim 32 wherein the polymerized monomer is styrene.

35. In a method for providing overprint varnish on a printed cellulosic article wherein a pervious, cellulosic substrate is printed with a printing ink to provide a printed article, an aqueous vehicle is applied as continuous film coating upon the surface of the printed article, and permitting the aqueous coating to dry and thereby provide printed article having the aqueous vehicle solids as a coating film thereon, the improvement which comprises the utilization of an aqueous polymer dispersion as the aqueous coating vehicle, said aqueous polymer dispersion consisting essentially of:
a. a continuous, aqueous external phase consisting essentially of an adduct reaction product of an unsaturated glyceride oil and at least one dicarboxylic acid selected from the group consisting of an alpha, beta-ethylenically unsaturated dicarboxylic acid and an alpha, beta-ethylenically unsaturated dicarboxylic acid anhydride, said adduct reaction product being reacted and neutralized with an aqueous solution of a nitrogen base in an amount sufficient to provide a water-soluble, salt reaction product having a pH within the range of 7.0 to 10.0 wherein said nitrogen base is characterized as containing at least one hydrogen atom reactive with said dicarboxylic acid adduct moiety,
b. a non-continuous, internal phase of minute polymerized monovinyl aromatic polymer particles having an average particle size of less than 0.4 micron uniformly dispersed within said external phase, said polymer dispersion being further characterized as containing (on total weight basis) at least 40% by weight dry solids of said external phase and said internal phase and at least one part to less than four parts external phase dry solids for each six parts by weight of dry internal phase solids, and a sufficient amount of water to permit the aqueous dispersion to over-print the cellulosic substrate therewith.

36. The method according to claim 35 wherein the styrene polymer dispersion is comprised of a continuous external phase consisting essentially of a maleated drying oil having more than about 25% by weight to about 40% by weight maleic anhydride substituents which are reacted and neutralized to a pH between 7.5 to 8.5 with a volatile nitrogen base having a boiling point (at atmospheric pressure) of less than 20°C.

37. The method according to claim 36 wherein at least a major portion of styrene polymer particle weight is comprised of polymerized styrene and the average particle size is within the range of about 0.05 to less than 0.25 micron.

38. The method according to claim 35 wherein the polymer particles consist essentially of at least one copolymerized monomer selected from the group consisting of styrene and the vinyl toluene and the dry solids content of the aqueous styrene polymer dispersion ranges from about 5% to about 60% by weight.

39. The method according to claim 38 wherein average particle size ranges from about 0.1 to less than 0.2 micron and the dry solids weight ratio of water-soluble adduct to styrene polymer particles ranges from about 1:3 to 2:3.

40. The method according to claim 39 wherein the external phase adduct moieties are characterized as consisting essentially of the amic salt substituents.

41. The method according to claim 39 wherein the polymer is comprised of at least 90% by weight of at least one polymerized monovinyl aromatic monomer selected from the group consisting of styrene and vinyl toluene.

42. The method according to claim 41 wherein the unpolymerized styrene monomer content (on total weight basis of the styrene polymer dispersion) is less than 0.4% by weight and the water-soluble adduct consists essentially of the amic salt of ammonium hydroxide.

43. The method according to claim 36 wherein the aqueous polymer dispersion is diluted with a sufficient amount of water to provide a No. 2 Zahn cup reading ranging from about 15 seconds to less than 35 seconds and the average polymer particle size is within the range of 0.1 micron to 0.2 micron.

44. The method according to claim 43 wherein the overprint varnish contains a sufficient amount of slip agent to impart slip characteristics to the dried overprint varnish.

45. The method according to claim 43 wherein the slip agent comprises a wax in an amount ranging from about 1% to about 3% by weight of the total overprint varnish weight.

46. The method according to claim 45 wherein the polymer particles consist essentially of styrene homopolymer particles.

47. In a method for printing pervious cellulosic substrates, such as paper and paperboards, wherein a water-type aqueous ink vehicle containing color imparting and other ink additives is employed to impregnate the substrate surface by rotogravure and flexographic printing means to provide printed substrates thereof, the improvement which comprises the printing thereof with a press-ready ink formulation containing an aqueous styrene polymer dispersion as a major ink binder (on a dry ink binder solids basis), said styrene polymer dispersion comprising:
  a. a continuous, aqueous external phase consisting essentially of an adduct reaction product of an unsaturated glyceride oil and at least on dicarboxylic acid selected from the group consisting of alpha, beta-ethylenically unsaturated dicarboxylic acid and an alpha, beta-ethylenically unsaturated dicarboxylic acid anhydride, said adduct reaction product being neutralized with an aqueous nitrogen base characterized as having at least on hydrogen atom chemically reactive with said dicarboxylic acid moieties to a pH within the range of 7.0 to 10.0, and
  b. a non-continuous, internal phase of minute styrene polymer particles having an average particle size of less than 0.4 micron uniformly dispersed within said external phase, said styrene polymer dispersion being characterized as containing at least one part to less than two parts eternal phase dry weight solids for each three parts by weight dry internal phase solids, the total dry solids weight of said external phase and said internal phase being at least 40% with the remaining non-solids portion of said styrene polymer dispersion consisting essentially of water, said styrene polymer dispersion being further characterized as containing less than 0.5% by weight monomeric styrene;
said press-ready ink being characterized as having a No. 2 Zahn cup value between about 25 to about 50 seconds and a total dry ink solids weight ranging from about 40% to about 80% by weight, said press-ink being further characterized as having a total dry solids weight between about 40% to about 55% by weight and pigment to binder ratio between about 1:2 to about 1:1 when the major coloring agent (total coloring agent weight basis) is an organic coloring agent; and between 55% to about 80% by weight total dry solids and a pigment to binder ratio from about 3:2 to about 5:2 when the major coloring agent (total coloring agent weight basis) is an inorganic coloring agent.

48. The method according to claim 47 wherein the styrene polymer dispersion is an adduct neutralized with ammonium hydroxide to a pH between about 7.5 to about 8.5.

49. The method according to claim 47 wherein the unsaturated glyceride oil of the styrene polymer dispersion is a maleic anhydride reaction product having at least 2 moles to about 4.0 moles as substituents per mole of glyceride oil.

50. The method according to claim 47 wherein the average styrene particle size is within the range of 0.05 micron to less than 0.25 micron and the polymer particles consist essentially of from about 50% by weight to 100% polymerized styrene, about 0 to about 50% by weight polymerized vinyl toluene and 0 to 10% by weight of another polymerized monoethylenically unsaturated monomer other than styrene and vinyl toluene.

51. The method according to claim 50 wherein the glyceride oil consists essentially of a maleic anhydride oil adduct in a molar ratio of at least 2.5 moles to about 3.5 moles of maleic anhydride for each mole of glyceride oil.

52. The method according to claim 51 wherein the glyceride oil is at least one drying oil selected from the group consisting of linseed oil and soybean oil.

53. The method according to claim 52 wherein the styrene polymer particles consist essentially of at least one polymerized monomer selected from the group consisting of styrene and vinyl toluene with styrene (on a weight basis) being the major polymerized monomer.

54. The method according to claim 53 wherein the major ink coloring agent (weight basis) in an organic coloring agent, the dry solids content is within the range of about 40% by weight to about 45% by weight and the pigment to binder ratio is from about 3:5 to about 4:5.

55. The method according to claim 54 wherein the polymer particle consists essentially of polystyrene particles having an average particle size of between 0.1 to 0.2 micron.

56. The method according to claim 55 wherein the No. 2 Zahn cup reading ranges from about 25 to about 35 seconds.

57. The method according to claim 56 wherein the water-soluble adduct consists essentially of the ammonium amic adduct salt.

58. The method according to claim 53 wherein the major ink coloring agent is an inorganic coloring agent, the dry solids content is within the range of about 65% to about 75% by weight.

59. The method according to claim 58 wherein the average particle size of the styrene polymer particle is within the range of 0.1 to 0.2 micron.

60. The method according to claim 59 wherein the styrene particles consist essentially of polystyrene.

61. The method according to claim 59 wherein the No. 2 Zahn cup value for the press-ready ink ranges from about 25 to about 35 seconds.

62. The method according to claim 61 wherein the adduct reaction product consists essentially of maleic anhydride glyceride adduct reacted and neutralized with ammonia hydroxide to provide the water-soluble amic salt thereof.

63. A fluid, aqueous wax concentrate consisting of finely divided wax particles uniformly dispersed within said concentrate and suitable for use in printing inks and coating compositions, said concentrate comprising a uniform admixture of:
  A. a polymer dispersion comprising:
    a. a continuous, aqueous external phase consisting essentially of an adduct reaction product of an unsaturated glyceride oil and at least one dicarboxylic acid selected from the group consisting of an alpha, beta-ethylenically unsaturated dicarboxylic acid and an alpha, beta-ethylenically unsaturated dicarboxylic acid anhydride, said adduct reaction product being reacted with an aqueous solution of a nirogen base having at least one acid reactive hydrogen moiety, in an amount sufficient to provide a water-soluble salt reaction product having a pH within the range of 7.0 to 10.0,
    b. a non-continuous, internal phase of minute, polymerized monovinyl aromatic polymer particles having an average particle size of less than 0.4 micron uniformly dispersed within said external phase, said polymer dispersion being further characterized as containing (on total dry weight basis) at least 40% by weight of said external phase and said internal phase, and at least one part to less than four parts external phase dry solids for each six parts by weight of dry internal phase solids, and B. wax particles uniformly dispersed throughout said polymer dispersion, said wax concentrate being further characterized as containing more than about 50% by weight solids and on a total dry solids weight basis and more than 25% by weight wax particles.

64. The concentrate according to claim 63 wherein the adduct consists essentially of the reaction product of a maleic anhydride oil and a glyceride oil in a molar ratio of at least 2.5 moles to about 3.5 moles of maleic anhydride for each mole of glyceride oil.

65. The concentrate according to claim 64 wherein the adduct is neutralized to a pH between about 7.5 to about 8.5 and the major nitrogen base (on a total weight nitrogen base weight basis) is a volatile base characterized as having a boiling point of less than 20°C. at atmospheric pressure.

66. The concentrate according to claim 65 wherein the adduct consists essentially of ammonium salt of amic acid.

67. The concentrate according to claim 66 wherein the total dry solids weight of polymer dispersion and wax ranges from about 60% to about 75% and the polymer dispersion dry solids to wax solids weight ratio ranges from about 1:1 to about 1:3.

* * * * *

UNITED STATES PATENT AND TRADEMARK OFFICE
CERTIFICATE OF CORRECTION

PATENT NO. : 3,950,290
DATED : April 13, 1976
INVENTOR(S) : Raymond L. Drury, Jr., Charles S. Nevin, James W. Hines It is certified that error appears in the above-identified patent and that said Letters Patent are hereby corrected as shown below:

Column 5, bridging lines 7/8, for "mono-ethanol ethanol amine" read ---mono-ethanol amine---
Column 9, line 21, for "methacrylamide, etc." read ---methacrylamide, acrylamide, etc.---
Column 10, line 7, for "components" read ---compositions---
Column 11, line 53, for "land" read ---and---
Column 13, line 14, for "$\lambda$%" read ---80%---
Column 15, line 65, for "carbons" read ---cartons---
Column 17, line 34, for "dvantages" read ---advantages---
Column 24, line 21, for "of" read ---or---
Column 24, line 61, for "Exmple" read ---Example---
Column 32, line 30, for "5%" read ---50%---
Column 34, line 13, for "in" read ---is---
Column 34, line 16, for "binder ratio" read ---binder weight ratio---
Column 34, line 59, for "nirogen" read ---nitrogen---

Signed and Sealed this

Twenty-ninth Day of March 1977

[SEAL]

Attest:

RUTH C. MASON
Attesting Officer

C. MARSHALL DANN
Commissioner of Patents and Trademarks